J. F. & H. E. SIPE.
SPRING WHEEL FOR VEHICLES.
APPLICATION FILED DEC. 24, 1909.
1,080,379.
Patented Dec. 2, 1913.
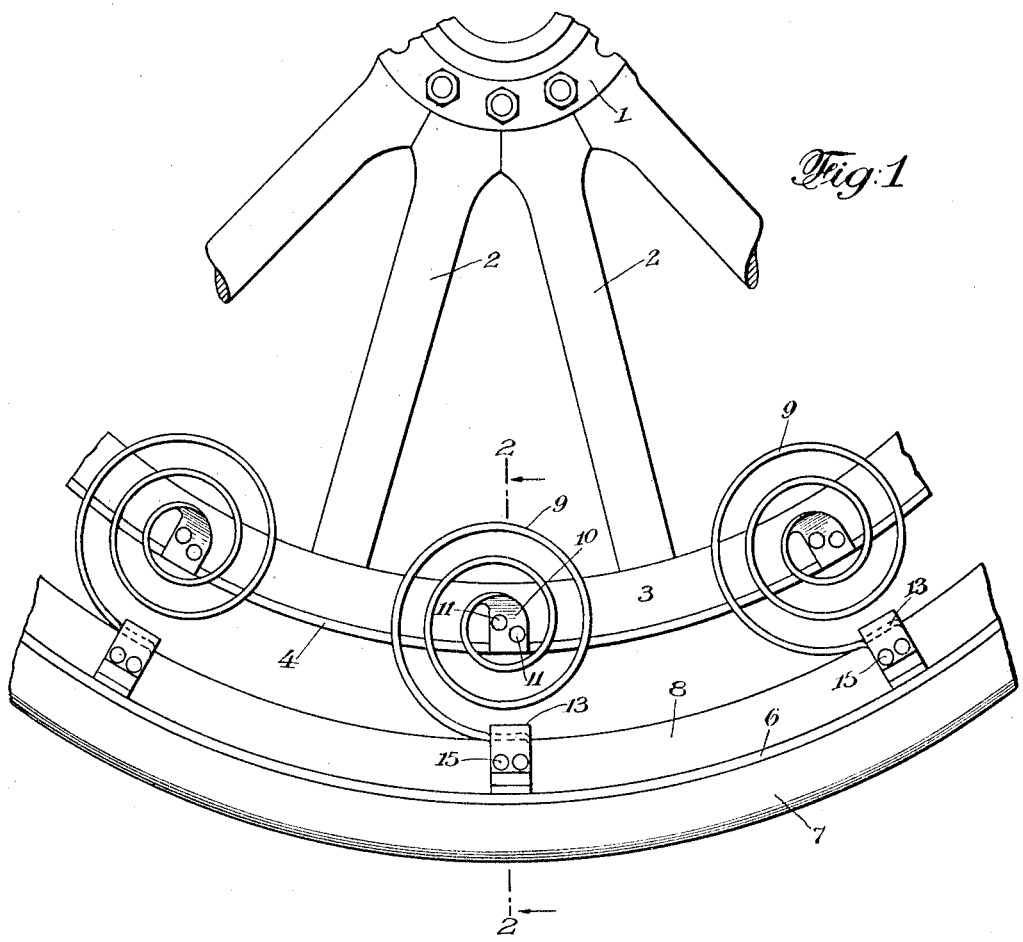
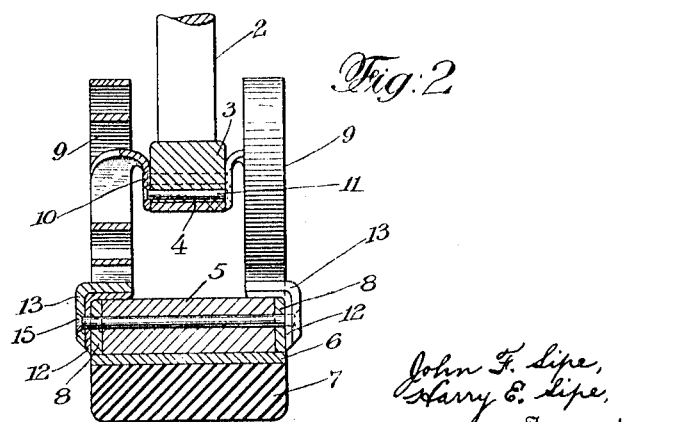

UNITED STATES PATENT OFFICE.

JOHN F. SIPE AND HARRY E. SIPE, OF NEW YORK, N. Y.

SPRING-WHEEL FOR VEHICLES.

1,080,379.

Specification of Letters Patent. Patented Dec. 2, 1913.

Application filed December 24, 1909. Serial No. 534,820.

*To all whom it may concern:*

Be it known that we, JOHN F. SIPE and HARRY E. SIPE, citizens of the United States, and residents of New York city, in the county and State of New York, have invented certain new and useful Improvements in Spring-Wheels for Vehicles, of which the following is a specification.

Our invention relates to improvements in spring wheels and the object of the invention is to supply a resilient wheel, very simple in construction, compact in design and of great lateral and vertical strength.

Another object of the invention is to secure great resilience without any of the disadvantages residing in spring wheels which are constructed with joints or connections having parts that move one upon another.

In the present invention ample movement is secured between the hub member and the tread member and this occurs entirely by reason of the movement of the springs themselves, thus avoiding the noise, the wear and tear and also the multiplicity of parts present in spring wheels which have connections or joints with movable parts between the springs and the members or where there is sliding contact to furnish lateral strength.

Another object of the invention is to eliminate all the parts ordinarily employed between the hub member and the tread member, except the springs themselves, thus doing away with the brackets, plates and movable joints ordinarily employed.

Another object of our invention is to supply a spring wheel of great durability.

The invention is illustrated in the accompanying drawings in which—

Figure 1 is a side view of a part of a wheel embodying the said invention; and Fig. 2 is a cross-section of the tread member and part of the hub member on the line 2—2 of Fig. 1, showing the manner in which the springs are connected with the said members.

Similar numbers indicate similar parts in the two figures.

Referring to the drawings, 1 is the hub of a wheel, 2, 2 are the spokes.

3 is a wooden felly, 4 is a steel band attached in any suitable manner to the periphery of the felly 3.

The parts already enumerated constitute the wheel member containing the hub, or what may be called the hub member of the wheel.

5 is a wooden felly constituting a part of the tread member of the wheel. This wooden felly is preferably made three inches larger in inside diameter than the outside diameter of the steel band 4 of the hub member.

6 is a steel band which is fastened in any suitable manner to the periphery of the felly 5.

7 is a thin solid rubber tire which is fastened in any suitable manner to the outer surface of the band 6.

8, 8 are side plates which are preferably annular in form and which are bolted or otherwise suitably fastened to the sides of the felly 5. The parts from 5 to 8 inclusive constitute a wheel member containing a tread, or what may be called the tread member. The tread member is made about two inches wider than the felly of the hub member.

9, 9 are specially wound flat coiled springs by means of which the hub member and the tread member are connected together in such a manner as to suspend the hub member within the tread member on the springs. These springs are wound open, one coil within another. They are arranged in two series on opposite sides of the plane of the wheel, that is to say, one series is on one side of the plane of the wheel and the other series is on the other side of the plane of the wheel.

In the best form of the invention, namely that illustrated in the drawings, the inner end of the spring is bent inwardly and bolted or otherwise fastened to the side of the felly of the hub member as represented at 10. The springs are preferably arranged in pairs, as shown, and the inner ends of such a pair of springs are bolted to the felly of the hub member and to each other by means of the bolts 11, as shown in Fig. 2. The outer ends of the springs are bent outwardly so as to extend down the side of the annular plate 8 as shown at 12 in Fig. 2.

13, 13 are clamping plates adapted to fit over the outer ends of the springs and the parts are secured together by the bolts 15 passing entirely through the felly 5 and connecting the outer ends of the springs with the tread member, as clearly shown in Fig. 2. It will be seen that the outer end of each spring is connected with the side of the tread member or near the side thereof so that a sufficient space is left between the springs on one side of the wheel and the springs on the other side of the wheel to allow the hub member to be suspended between the two series of springs and to have a certain sidewise play between the two before it will strike against the edges of the coils of the springs. It will be seen that the two members of the wheel are spaced circumferentially apart and that one series of the springs lie on one side of the hub member and the other series of springs lie on the other side of the hub member, thus allowing the hub member to move vertically or eccentrically between the two series of coils springs. It will also be seen that the coils of the springs are set edgewise of the hub member and thus afford a strong lateral stop on each side of the hub member.

We prefer to make the springs of strap steel about three-fourths of an inch wide and one-eighth of an inch thick. We usually employ twelve pairs of these springs to each wheel, twelve springs on each side of the wheel. This construction allows for the vertical and eccentric movement of the hub member in relation to the tread member for a distance of one and one half inches in all directions, since the space between the hub member and the tread member is entirely unoccupied. The springs themselves create a yielding lateral stop for the hub member in relation to the tread member since the inner coils will allow a slight lateral movement before the hub member comes in contact with the outer coils of the springs. The springs themselves operate as a yielding torsional stop.

Our improvement secures a great deal of resiliency and strength. The construction is simple, compact and economical. All of the springs in this construction are placed in a normal neutral position, and thus the tendency of all the springs is to hold the hub member and the tread member concentric and any tendency to eccentric movement between the two members is opposed by all of the springs alike and thus all of the springs operate together at all times in opposing the load carried by the hub member.

What we claim as new and desire to secure by Letters Patent, is:

1. In a spring wheel the combination of a wheel member containing a hub, the felly 3, connecting parts between the hub and the felly, the felly 5 made wider than the felly 3 and provided with a suitable tire, and the separate and independently operating strong flat coiled springs 9 having their inner ends bent inwardly and secured to the side of the felly 3, and having their outer ends secured to the felly 5 near the edges thereof so as to rest upon the inner face of the felly, whereby the hub member is suspended between the springs and the outer coils of the springs form stops to limit the lateral motion of the hub member and the springs are supported by the inner face of the felly, substantially as shown and described.

2. In a spring wheel the combination of a wheel member containing a hub, a felly 3, connecting parts between the hub and the felly, the felly 5 made wider than the felly 3 and provided with a suitable tire, the strong flat coiled springs 9 having several coils one within another, and having their inner ends bent inwardly and secured to the side of the felly 3 and having their outer ends bent outwardly so as to fit against the sides and inner face of the felly 5, and clamping plates 13 to clamp the outer ends of the springs to the felly 5, substantially as shown and described.

In testimony whereof, we have signed our names to this specification, in the presence of two subscribing witnesses.

JOHN F. SIPE.
HARRY E. SIPE.

Witnesses:
GEO. M. HARRIS,
EDWIN SEGER.

Copies of this patent may be obtained for five cents each, by addressing the "Commissioner of Patents, Washington, D. C."